UNITED STATES PATENT OFFICE.

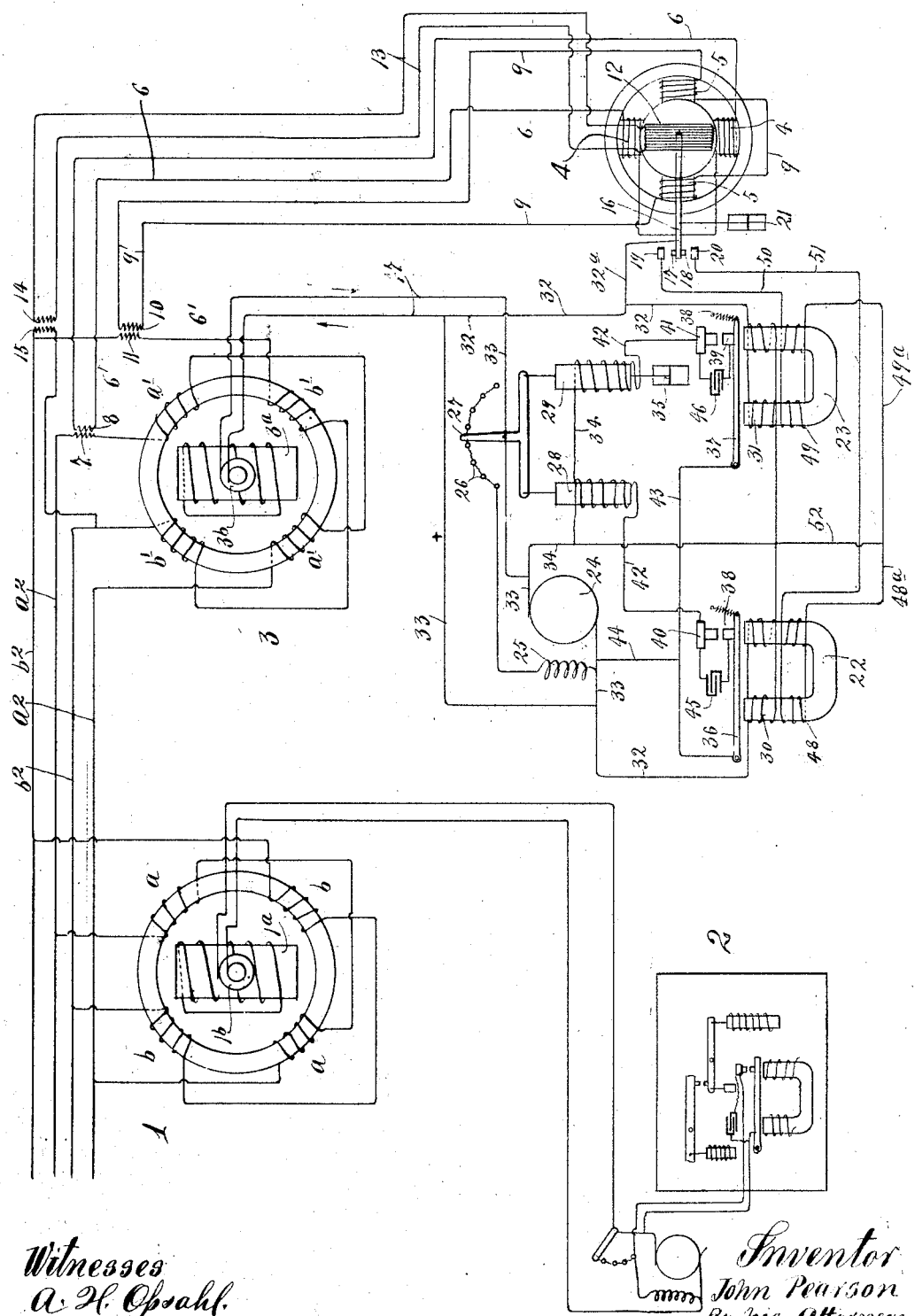

JOHN PEARSON, OF SOMERSET, WISCONSIN, ASSIGNOR OF ONE-THIRD TO JAMES F. WILLIAMSON AND ONE-SIXTH TO FRANK D. MERCHANT, OF MINNEAPOLIS, MINNESOTA.

POWER-FACTOR CONTROLLER.

983,835.  Specification of Letters Patent.  Patented Feb. 7, 1911.

Application filed July 20, 1907. Serial No. 384,765.

*To all whom it may concern:*

Be it known that I, JOHN PEARSON, a citizen of the United States, residing at Somerset, in the county of St. Croix and State of Wisconsin, have invented certain new and useful Improvements in Power-Factor Controllers; and I do hereby declare the following to be a full, clear, and exact description of the invention, such as will enable others skilled in the art to which it appertains to make and use the same.

This invention relates to the regulation of the power factor in electric generating and transmitting systems and has for its especial object to provide an improved means for automatically controlling the fields of generators, motors and synchronous converters running in parallel.

To the above ends the invention consists of the novel devices and combinations of devices hereinafter described and defined in the claims.

It is desirable in all transmission lines to have a high power factor at all times. By the proper regulation, this is possible in systems where alternators feed current into the line and at the end of the line are synchronous motor generators or synchronous converters taking the power. In cases where synchronous converters or synchronous motors are running in parallel with alternators, if the field excitation is increased, in either the converters, motors or alternators, it has a tendency to make the current lead, and if the field excitation, on the other hand, is decreased, it has a tendency to make the main current lag.

My present invention comprises an element responsive to phase difference, between voltage and current and arranged to automatically swing in one direction, when the current leads, and in the other direction when the current lags, which controls a rheostat, or other variable resistance device, for the purpose of weakening or strengthening the field of the synchronous motor, synchronous converter, or synchronous alternator. The device for automatically performing this function, I designate as an automatic power factor regulator. In cases where the voltage is controlled at the generating end of the line, it is usually desirable to thus regulate or control the fields of the synchronous converters and synchronous motors which machines are located at the distributing end of the line.

The invention is illustrated diagrammatically in the drawing, in which the numeral 1 indicates, as an entirety, an alternating current generator which, as shown, is of the two-phase type and the voltage of which is regulated by what is generally known as the "Tirril" voltage regulator, indicated as an entirety by the numeral 2 and by a coöperating electrical field exciter $2^a$. The construction and operation of these mechanisms are well understood and, hence, here require no detailed description.

The numeral 3 indicates, as an entirety, a synchronous motor of the two-phase type which is located at the distributing end of the line. The corresponding phase coils of both the alternating generator and of the motor are indicated by the same characters with different powers, to-wit, the letters $a$—$a'$ and $b$—$b'$, and the corresponding connecting wires of the line are indicated by the characters $a^2$ and $b^2$.

The generator field is designated by the character $1^a$ and the motor field by the character $3^a$.

The generator slip rings are indicated by the character $1^b$ and the motor slip rings by the character $3^b$.

The automatic power factor regulator comprises a device responsive to phase difference between voltage and current, and a relay mechanism for the purpose of reducing the amount of current used at the main contacts, thereby making possible the use of a much smaller and more sensitive device responsive to phase changes between voltage and current than could otherwise be employed.

*Device responsive to phase change between voltage and current.*—Of the parts of this device, as illustrated in the drawing, the numerals 4 and 5 indicate coils, of which coils the two coils 4 are axially alined and the coils 5 are axially alined, but the said coils 4 and 5 are in this two-phase transmission system located at right angles or ninety degrees apart. By wires 6 the coils 4 are connected to the secondary 8 of a current transformer, the primary 7 of which is in one of the line wires $a^2$ so that a current which corresponds in phase with coils $a$—$a'$ of the generator and motor will be passed through the said coils 4 of the device responsive to phase difference between current and voltage. The coils 5 are connected by wires 9 to the secondary 10 of a current transformer, the primary 11 of which is in one of the line wires $b^2$, so that there will be passed through the coils 5 a current which is ninety degrees out of phase with the current in coils 4. The current in coils 4 will be maximum when the current in coils 5 is zero, and as is evident, a rotating field will be produced by these coils.

A coil 12 is pivotally mounted for oscillatory movements on an axis that is located at the intersection of the projected axes of the coils 4 and 5. By wires 13 this coil 12 is connected to the secondary 14 of a voltage transformer, the primary 15 of which is connected across two of the line wires $b^2$—$b^2$, so that there will pass through this coil 12 a current which corresponds in phase with the voltage of phase $b$—$b'$ of the main line, or in other words, with the coils $b$ of the generator and motor. The coil 12 tends to take a position with its axis in line with the axis of the coils 5, when its voltage is in phase with the current of coils 5. When the current in coils 5 is maximum, the current in coils 4 is zero, also when the current in coils 5 is maximum the voltage in coil 12 will be maximum, when these two currents are in phase. Consequently, when the current in coils 5 and the current in coil 12 are maximum, the field of coils 5 will be through their axes, and the field of coil 12 will be through its axis and coil 12 will adjust itself to such a position that its field will also be in the direction of the axes of coils 5 when these currents are in phase. Of course, when the current dies out, or drops to zero in coils 5, the current in coil 12 also drops to zero, when these two are in phase. At this time, coil 12 produces no field, otherwise, at this instant, if it had a field the same as a compass needle, it would shift so that its direction of lines of force would be the same as the direction of the lines of force of coils 4. If the phase of the voltage through coil 12 is shifted a few degrees, in respect to the current in coils 5, then the axis of the coil 12 will tend to shift a few degrees and change the contact lever up or down as the case may be. Said coil 12 carries a contact lever 16 which has contacts 17 and 18 projecting in both directions from its free end. These contacts 17 and 18 are adapted to engage, respectively, with fixed contacts 19 and 20. The vibratory movements of the controller lever 16 are preferably retarded by a dash pot connection 21. The numerals 22 and 23 indicate two relays. The numeral 24 indicates an electrical exciter, and the numeral 25 its field. The numeral 26 indicates a variable resistance, such as a rheostat, which, as will presently appear, serves to vary the field current of the exciter and, hence, the field current of the synchronous motor 3.

The numeral 27 indicates the vibratory contact of the rheostat 26.

28 and 29 are rheostat adjusting solenoids having cores that are connected to arms of the rheostat contact lever 27. These solenoids should be powerful enough to quickly move the rheostat contact 27 in the one direction or the other according to which solenoid is energized. When the contact 27 is moved by the solenoid 29, the resistance is increased, while when said contact is moved by said coils 28 the resistance will be decreased. The relays 22 and 23 serve to reduce the arc at contacts 17, 18, 19 and 20. Coils 30 of relay 22, and coils 31 of relay 23 are permanently connected by wires 32—32 to exciter bus bars 33. Wire $32^a$ connects the controller lever 16 to the positive bus bar and through the latter to the movable contacts 17 and 18. The coils of the solenoids 28 and 29 are connected by a wire 34 to one of the bus bars 33, which bus bar is also connected to movable contact 27 of the rheostat.

The numeral 35 indicates a small dash pot and piston which prevents fluctuations or sudden movements of the cores of the solenoids 28 and 29 and, hence, of the movable contact 27.

The numerals 36 and 37, respectively, indicate spring suspended contact levers or armatures that are respectively subject to the relay magnets 22 and 23 and carry contact points 38 and 39, respectively. The contacts 38 and 39 coöperate, respectively, with fixed contacts 40 and 41. The contact 40 is connected by a wire 42 to the lower terminal of the solenoid 28, while the contact 41 is connected by a wire 42 to the lower terminal of the solenoid 29. The two armatures 37 and 36 are connected by a wire 43, which wire is connected by a short wire 44 to one of the exciter bus bars 33. A condenser 45 is connected across the relay contacts 38 and 40, and a condenser 46 is connected across the relay contacts 39 and 41.

The numeral 47 indicates the field wires that connect the exciter bus bars 33 with the slip rings $3^b$ of the synchronous motor 3.

Relay coils 48 and 49 respectively, of the relays 22 and 23 are wound reversely to the coöperating relay coils 30 and 31. The fixed regulator contact 19 is connected by a wire 50 to one terminal of relay coil 49, and the fixed regulator contact 20 is connected by a wire 51 to the upper terminals of relay coils 48. The lower terminals $48^a$ and $49^a$ of relay coils 48 and 49 are connected to a wire 52 that affords a common return wire therefor and for the coils 30 and 31, to the negative exciter bus bar 33, as shown, through the wire 34.

*Operation.*—Exciter 24 is exciting the field of synchronous motor 3, through bus bars 33, wires 47 and slip rings 3^b, and the current through the exciter field 25 is regulated by rheostat 26 and movable contact 27. As is evident, when the resistance through the field of said exciter is increased, the excitation of the field of motor 3 will be decreased, and conversely, when the resistance through the field of said exciter is decreased, the excitation of the field of said motor 3 will be increased. When the voltage and current of the transmission line are in phase, the vibratory coil 12 of the power factor responsive device will assume a position to hold the lever 16 and contacts 17 and 18 in intermediate position shown. The relay coils 30 and 31 are constantly energized by the current flowing through the exciter bus bars 33 and wires 32, and 34. When the current in the transmission line "leads" the coil 12 will be oscillated in a direction to move the lever 16 upward and thus engage the contact 17 with the fixed contact 19, and thereby cause the current to flow through exciter bus bars 33, wires 32, 32^a, 50, relay coils 49 and wires 52 and 34. This causes the relay coils 49 to be energized, and to thereby neutralize or overcome the energy of the coöperating coils 31, so that the armature 37 will be moved upward by its spring and carry the contact 39 into engagement with the fixed contact 41. This closes the circuit through the rheostat adjusting solenoid 29, by way of exciter bus bars 33, wire 34, armature 37, wires 43 and 44. When the solenoid 29 is energized its core moves downward and the rheostat lever 27 is moved toward the right, thereby increasing the resistance through the field 25, exciter 24, and this, as is evident, will cause the field excitation of said exciter and hence of the motor 3 to be decreased until the current ceases to lead the voltage in the transmission line.

When the current in the transmission line lags, the coil 12 will be oscillated in a direction to lower the lever 16 and thereby move the contact 18 into engagement with the contact 20. When this is done, the coils 48 of the left hand relay will be energized, by the current flowing through exciter bus bars 33, wires 32, 32^a, 51, 52 and 34. When said coils 48 are thus energized, they neutralize or overcome the energy of the coils 30, thereby permitting the armature 36 to be moved upward by its spring and carry the contact 38 into engagement with the fixed contact 40. This will cause the left hand rheostat actuating coil 28 to be energized, by current flowing through the exciter bus bars 33, wires 34, 42, armature 36, and wires 44. As is evident, when the said solenoid 28 is energized, its core will be moved downward, thereby moving the rheostat lever 27 toward the left, thus decreasing the resistance through the exciter field 25, with the result that the excitation of the said exciter field and hence of the field of the motor 3 will be increased until the current is brought up into phase with the voltage of the current in the transmission line. It will thus be seen that the current is automatically kept in phase with the voltage, by means of my improved "power factor regulator."

What I claim is:

1. In an electrical generating and transmitting system, the combination with synchronous electric machines running in parallel, of an exciter connected in the field of one of said synchronous electric machines, a rheostat in the field circuit of the exciter, reversely acting solenoids and connections for adjusting said rheostat, reversely acting electrical relays with connections for controlling said solenoids, electrical connections, including a pair of fixed contacts, for rendering said relays reversely acting, said solenoids and relays being energized from the exciter circuit, and an automatic power factor regulator having relatively fixed and relatively movable windings, one subject to current changes and the other to voltage changes in the line, and the said movable member thereof having a reversely acting contact coöperating with the fixed contacts of said relay connections, substantially as described.

2. In an electrical generating and transmitting system, the combination with synchronous electric machines running in parallel, of an exciter connected in the field of one of said synchronous electric machines, a rheostat in the field circuit of the exciter, reversely acting solenoids and connections for adjusting said rheostat, reversely acting relays with connections for controlling said solenoids, said relays having coils permanently connected in the exciter circuit, and open coils in opposition thereto, electrical connections including a pair of fixed contacts for energizing the opposition coils on said relays, and an automatic power factor regulator having relatively fixed and relatively movable windings, one subject to current changes and the other to voltage changes in the line, the said movable member thereof having a reversely acting contact coöperating with the fixed contacts of the opposition coils of the relays, substantially as described.

3. In an electrical generating and transmitting system, the combination with synchronous electric machines running in parallel, an exciter connected in the field of one of said synchronous electric machines, a rheostat in the field circuit of the exciter, reversely acting solenoids and connections for adjusting said rheostat, reversely acting relays with connections for controlling said solenoids, said relays having coils permanently connected in the exciter circuit, and open coils in opposition thereto, electrical connections with the exciter circuit including a pair of fixed contacts for energizing the opposition coils on said relays, and an automatic power factor regulator having relatively fixed and relatively movable windings, one subject to current changes and the other to voltage changes in the line, the said movable member thereof having a reversely acting contact coöperating with the fixed contacts of the opposition coils of the relays, substantially as described.

In testimony whereof I affix my signature in presence of two witnesses.

JOHN PEARSON.

Witnesses:
ROSE E. LAGRANDEUR,
H. A. LAGRANDEUR.